US010645597B2

(12) United States Patent
Ahuja

(10) Patent No.: US 10,645,597 B2
(45) Date of Patent: *May 5, 2020

(54) MESSAGE BY MESSAGE TUNABILITY OF MESSAGE RELIABILITY IN A CELLULAR NETWORK

(71) Applicant: Roblox Corporation, San Mateo, CA (US)

(72) Inventor: Chetan Ahuja, Burlingame, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/143,455

(22) Filed: Sep. 27, 2018

(65) Prior Publication Data

US 2019/0268783 A1    Aug. 29, 2019

Related U.S. Application Data

(63) Continuation-in-part of application No. 15/684,661, filed on Aug. 23, 2017, now Pat. No. 10,382,981.
(Continued)

(51) Int. Cl.
*H04W 24/02* (2009.01)
*H04W 48/16* (2009.01)
(Continued)

(52) U.S. Cl.
CPC .......... *H04W 24/02* (2013.01); *H04W 48/16* (2013.01); *H04W 8/24* (2013.01); *H04W 48/14* (2013.01)

(58) Field of Classification Search
CPC ... G06F 17/30864; G06K 9/72; H04W 24/02; H04W 76/19; H04L 67/2823
See application file for complete search history.

(56) References Cited

U.S. PATENT DOCUMENTS 8,817,968 B1    8/2014 Boutcher et al.
9,727,747 B1 *  8/2017 Kim ...................... H04L 63/102
(Continued)

FOREIGN PATENT DOCUMENTS

WO    2000070525    11/2000

OTHER PUBLICATIONS

WIPO, International Search Report and Written Opinion mailed for international application No. PCT/US2019/042492, dated Oct. 15, 2019, 7 pages.

*Primary Examiner* — Jung H Park

(57) ABSTRACT

In one aspect, a computer-implemented process useful for implementing a message-by-message tunability of message reliability in a data-communication network comprising: providing an intermediate networking service for messaging between a plurality of different nodes of a data-communication network; periodically probing the data-communication network of a mobile device to determine an identity of the data-communication network; querying an operating system of the mobile device to determine a current state of the data-communication network; and configuring a data transmission of a tuned message using an optimized protocol of the data-communication network based on a transmission speed of the current state of the data-communication network.

12 Claims, 8 Drawing Sheets

Related U.S. Application Data which is a continuation-in-part of application No. 14/818,284, filed on Aug. 4, 2015, now Pat. No. 10,098,174, which is a continuation-in-part of application No. 14/510,641, filed on Oct. 9, 2014, now Pat. No. 9,516,519.

(60) Provisional application No. 62/700,731, filed on Jul. 19, 2018, provisional application No. 61/944,401, filed on Feb. 25, 2014.

(51) Int. Cl.
*H04W 8/24* (2009.01)
*H04W 48/14* (2009.01)

(56) References Cited

U.S. PATENT DOCUMENTS

| | | | |
|---|---|---|---|
| 2001/0001616 A1 | 5/2001 | Rakib et al. | |
| 2005/0135248 A1* | 6/2005 | Ahuja | H04L 47/10 370/235 |
| 2006/0015563 A1 | 1/2006 | Judge et al. | |
| 2013/0114408 A1* | 5/2013 | Sastry | H04W 28/02 370/231 |
| 2013/0291043 A1 | 10/2013 | Xie et al. | |
| 2018/0102023 A1 | 4/2018 | Baszucki | |
| 2018/0132115 A1 | 5/2018 | Ahuja | |

* cited by examiner

US 10,645,597 B2

MESSAGE BY MESSAGE TUNABILITY OF MESSAGE RELIABILITY IN A CELLULAR NETWORK

CROSS REFERENCE TO RELATED APPLICATIONS

This application is a non-provisional of and claims priority under 35 U.S.C. § 119(e) to U.S. Provisional Patent Application No. 62/700,731 filed on Jul. 19, 2018 and is also a continuation in part of and claims priority under 35 U.S.C. § 120 to U.S. patent application Ser. No. 15/684,661 filed on Aug. 23, 2017, now U.S. Pat. No. 10,382,981. U.S. patent application Ser. No. 15/684,661 is a continuation in part of and claims priority under 35 U.S.C. § 120 to U.S. patent application Ser. No. 14/818,284, filed on Aug. 4, 2015, now U.S. Pat. No. 10,098,174. U.S. patent application Ser. No. 14/818,284 is a continuation in part of and claims priority under 35 U.S.C. § 120 to U.S. patent application Ser. No. 14/510,641 filed on Oct. 9, 2014, now U.S. Pat. No. 9,516,519. U.S. patent application Ser. No. 14/510,641 is a non-provisional of and claims priority under 35 U.S.C § 119(e) to U.S. Provisional Patent Application No. 61/944,401 filed on Feb. 25, 2014. These applications are hereby incorporated by reference in their entirety.

BACKGROUND

Field of Invention

The invention is in the field of computer networks and more specifically to a method, system and apparatus of a cellular network optimized protocol.

Background

The transmission control protocol (TCP) provides a core protocols of the Internet protocol suite (IP). Web browsers use TCP when they connect to servers on the World Wide Web, and it is used to deliver email and transfer files from one location to another. Traditionally, web browsers operated in stationary personal computers. However, it is currently common for users to access the Internet from portable mobile devices (e.g. smart phones, wearable computers, head-mounted computers, etc.). Mobile devices often use cellular data networks. Various TCP protocols may not be optimized for cellular data networks.

BRIEF SUMMARY OF THE INVENTION

In one aspect, a computer-implemented process useful for implementing a message-by-message tunability of message reliability in a data-communication network comprising: providing an intermediate networking service for messaging between a plurality of different nodes of a data-communication network; periodically probing the data-communication network of a mobile device to determine an identity of the data-communication network; querying an operating system of the mobile device to determine a current state of the data-communication network; and configuring a data transmission of a tuned message using an optimized protocol of the data-communication network based on a transmission speed of the current state of the data-communication network.

BRIEF DESCRIPTION OF THE DRAWINGS

The present application can be best understood by reference to the following description taken in conjunction with the accompanying figures, in which like parts may be referred to by like numerals.

Figure 1:
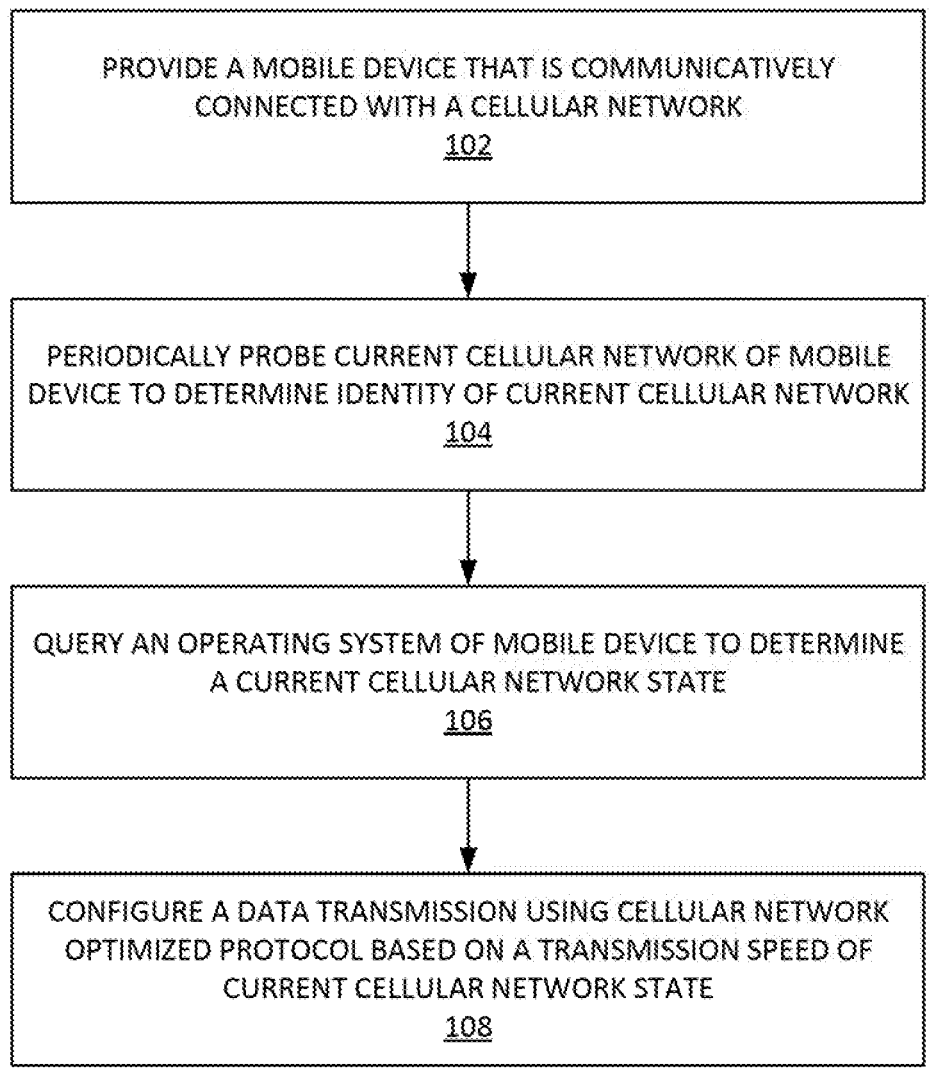
FIG. 1 illustrates an example process for optimizing a cellular network protocol, according to some embodiments.

The Figures described above are a representative set and are not an exhaustive with respect to embodying the invention.

DESCRIPTION

Disclosed are a system, method, and article of manufacture of message by message tunability of message reliability in a cellular network. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Cellular data network can be a cellular network that communicates data packets between the Internet and mobile device.

Global Positioning System (GPS) can be a space-based satellite navigation system that provides location and time information in all weather conditions, anywhere on or near the Earth where there is an unobstructed line of sight to four or more GPS satellites. As used herein, GPS can also include various assisted GPS configurations (e.g. Mobile Station Assisted (MSA), Mobile Station Based (MSB), stand alone, MSA hybrid, etc.).

Hypertext Transfer Protocol (HTTP) can be an application protocol for distributed, collaborative, hypermedia information systems.

Internet protocol (IP) proxy server can be a server (e.g. a computer system or an application) that acts as an intermediary for requests from clients (e.g. a mobile device's web browser) in a cellular network seeking resources from other servers.

IP address, a computer's address under the Internet Protocol

TCP/HTTP request can be any transmission control protocol (TCP)-based request. For example, it can be an HTTP request. However, in other example embodiments other protocols (e.g. HTTPS, SMTP, POP3, IMAP, SSH, FTP, Telnet and a variety of other protocols are typically encapsulated in a TCP request) can be implemented in lieu of the HTTP protocol.

Exemplary Methods and Systems

FIG. 1 illustrates an example process 100 for optimizing a cellular network protocol. In step 102, process 100 can provide a mobile device that is communicatively connected with a cellular network. In step 104, process 100 can periodically probe the current cellular network of the mobile device to determine the identity of the current cellular network. In step 106, process 100 can query an operating system of the mobile device to determine a current cellular network state. In step 108, process 100 can configure a data transmission using the cellular network optimized protocol based on a transmission speed of the current cellular network state. Additional information for implementing example embodiments of process 100 is provided infra.

Figure 2:
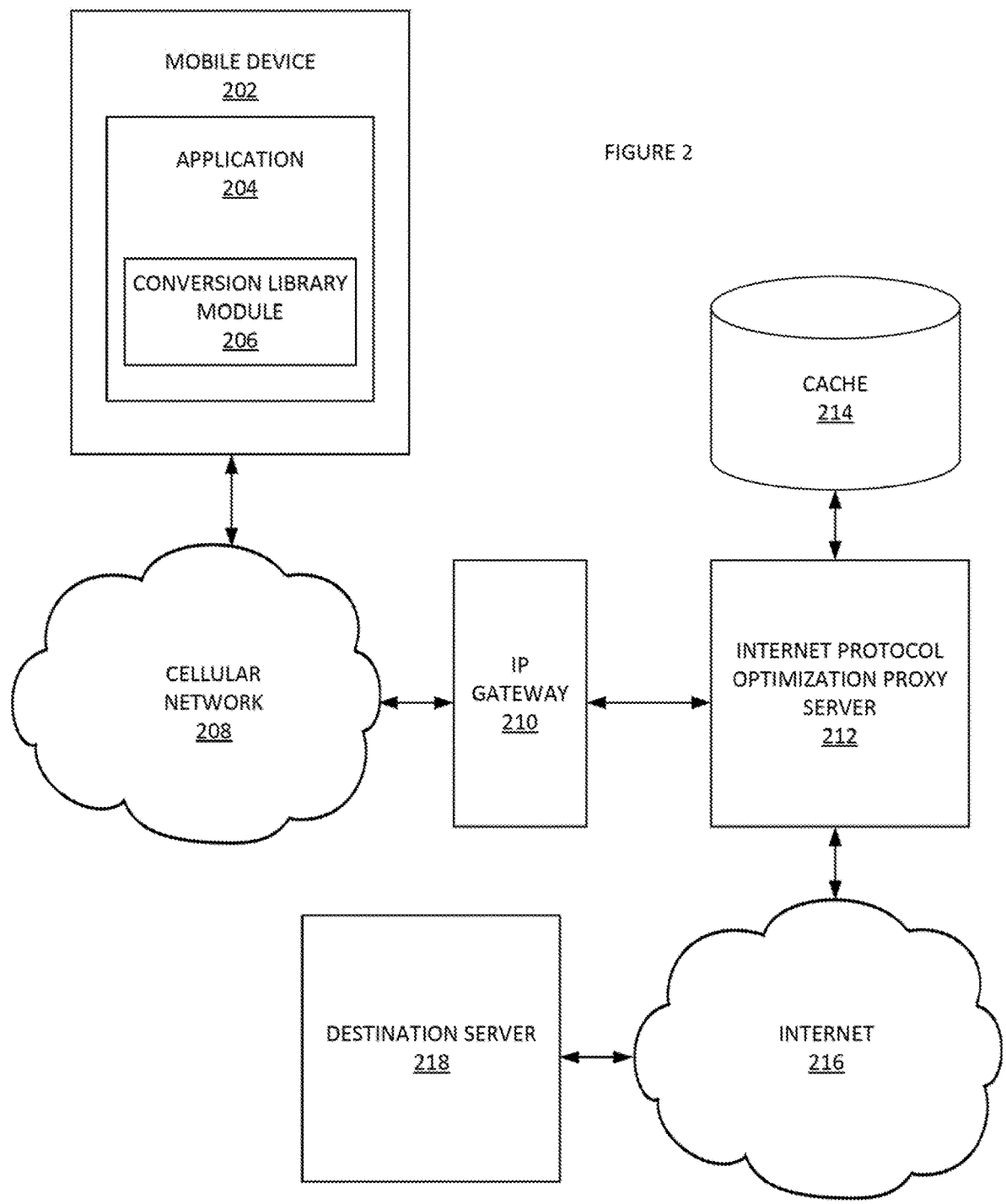
FIG. 2 depicts a system for Internet protocol optimization of cellular data network, according to some embodiments.

FIG. 2 depicts a system 200 for Internet protocol optimization of cellular data network, according to some embodiments. Mobile device 202 can be a handheld and/or wearable computing device such as, inter alia, a smart phone, tablet computer, body-wearable computer (e.g. a 'smart watch', a head-mounted optical display system such as Google Glass®, a virtual reality head-mounted display device such as Oculus Rift® a handheld game console, a portable navigation system, etc.), a house-hold appliance, an internet of things device, etc. More generally, in some embodiments, any computing system that runs applications that communicate with the Internet 216 via a cellular or other wireless network 208 can operate in system 200 in lieu of mobile device 202. Application 204 (e.g. a 'mobile application', an 'app') can be application software designed to run in mobile device 202. System 200 can provide mobile device 202 with a unique identifier. The unique identifier can be used to identify mobile device 202 during a session in lieu of other identifiers such as, inter alia, IP address (see FIGS. 3 and 5 infra).

Cellular network 208 can be a radio network distributed over land areas served by at least one fixed-location transceiver (e.g. a base station). Cellular network 208 can communicate IP data packets between the Internet and mobile device 202 (e.g. as a cellular data network). Accordingly, mobile device 202 can communicate with an Internet-based entity via cellular network 208. Internet protocol (IP) gateway 210 can be an access point for Internet access from cellular network 208. IP gateway 210 can be a router or a proxy server that routes between cellular network 208 and such entities as IP optimization proxy server 212 and/or other Internet-based entities.

Application 204 can include client library module 206. Client library module 206 can convert (e.g. transparently transform) a TCP/HTTP request made by application 204 into a faster protocol optimized for propagation in a radio network such as cellular network 208. Client library module 206 can include a software development kit (SDK) provided by the cellular network optimized protocol system. It is noted that the conversion to the cellular network optimized protocol can be performed without making changes in a server associated with application 204. The conversion can be managed locally at the client-side of application 204.

The cellular network optimized protocol data packets can then be forwarded to IP optimization proxy server 212. As used herein, a proxy server can be a server that acts as an intermediary for requests from clients (e.g. application 204) seeking resources from other servers (e.g. destination server 218). Accordingly, IP optimization proxy server 212 receives the cellular network optimized protocol data packets. IP optimization proxy server 212 can then evaluate the incoming cellular network optimized protocol data packets and communicate with the destination server 218 (e.g. a google.com web server, an upstream server, a server that provides service to another server, a highest server in a server sequence hierarchy, etc.) of the original TCP/HTTP request. IP optimization proxy server 212 can request the service (e.g. a file, a connection, a web page, other web objects, etc.) designated by the original TCP/HTTP request from the destination server 218. IP optimization proxy server 212 can then serve the request response to application 204. In some embodiments, IP optimization proxy server 212 can also be utilized to push advertisements in the transmission to application 204. Advertisements can be germane to current content subject matter as detected by the IP optimization proxy server 212.

Data from past service requests can be stored in cache 214. Cache 214 can be a mechanism for the temporary storage (e.g. caching) of web documents, such as HTML pages and images. IP optimization proxy server 212 can also manage the settings of client library module 206 and/or a set of enterprise-managed mobile devices that include client library modules. For example, an administrator can enable/disable a particular client library module(s) with IP optimization proxy server 122 (e.g. with a dashboard functionality—not shown). In one example, enablement of client library module 206 can be tied to the identity of the user of the mobile device. In this way, a user of an enterprise's mobile device can log into an application 204 and automatically have client library module 206 enabled.

Administrators can also dynamically select a percentage of mobile devices in the enterprise's system that utilize the cellular network optimized protocol. For example, an administrator can select thirty percent (30%) of the mobile devices owned by her company to use the cellular network optimized protocol for communication in lieu of the TCP/HTTP protocol over a cellular network.

Access to use of the cellular network optimized protocol and elements of system 200 can be provided on a subscription fee basis. Subscriptions can be charged on a per monthly user basis. IP optimization proxy server 212 can include functionalities that collect and provide use information for subscription management and fees services.

It is noted that although the TCP/HTTP protocol is referred to throughout the document can be generalized to any TCP based protocol. For example, in some embodiments, the HTTPS can be used in lieu of and/or supplemental to the TCP/HTTP protocol. In some embodiments, any higher-level protocol running on a TCP-based protocol can be replaced by the cellular network optimized protocol for a speed enhancement. Additionally, while the cellular network optimized protocol is designed to be optimized for properties of cellular networks (e.g. high latencies and/or frequent packet drops etc.), it's not only the cellular networks that show these properties. A non-cellular example may be a heavily shared Wi-Fi network. Accordingly, the cellular network optimized protocol's methods and systems provided herein can be used to enhance other types of 'sub-optimal networks' and/or 'slow, lossy networks'.

Figure 3:
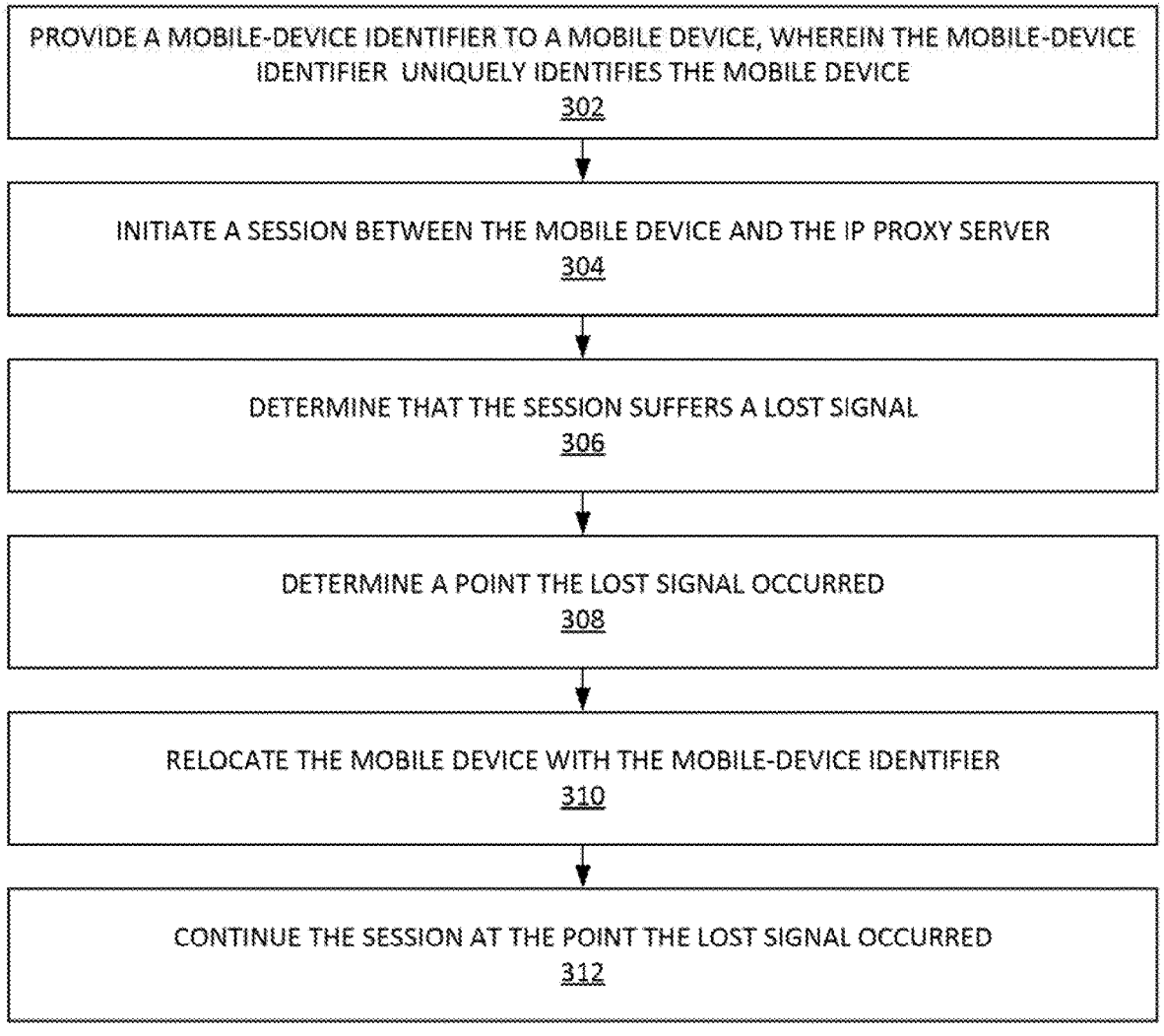
FIG. 3 illustrates an example process for maintaining continuous sessions In cellular data networks, according to some embodiments.

FIG. 3 illustrates an example process 300 for maintaining continuous sessions in cellular data networks, according to some embodiments. Process 300 can include the step 302 of providing a mobile-device identifier to a mobile device. The mobile-device identifier can uniquely identify the mobile device. In step 304, a session can be initiated between the mobile device and the IP proxy server. In step 306, it can be determined that the session suffers a lost signal. In step 308, a point when the lost signal occurred can be determined. Process 300 can include the step 310 of relocating the mobile device with the mobile-device identifier. The session can continue at the point the lost signal occurred. The mobile-device identifier can be applied at the proxy server level and/or at the conversion library module level.

Figure 4:
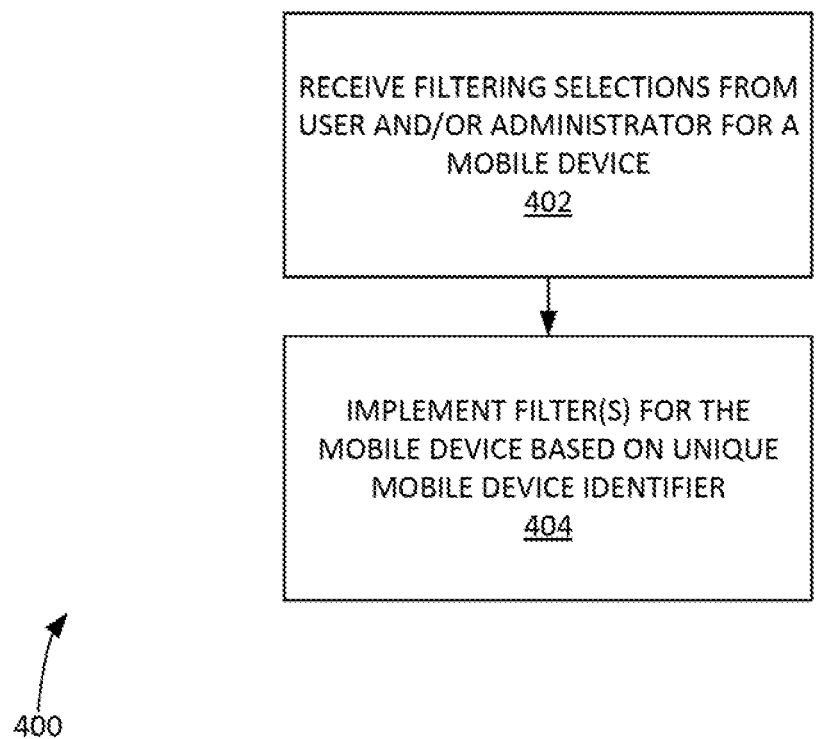
FIG. 4 provides an example process of content filtering, according to some embodiments.

In one example, some types of selected content can trigger utilization of the cellular network optimized protocol, while other types of content can still utilize a TCP/HTTP protocol. This type of filtering can also be implemented based on other factors such as time of day, location, and/or any combination of factors. FIG. 4 provides an example process 400 of content filtering, according to some embodiments. In step 402 of process 400, filtering instructions from a user and/or administrator are received for a particular mobile device. The filtering instructions can be applied at the proxy server level and/or at the conversion library module level. In step 404, the filter(s) are implemented with respect to the particular mobile device (e.g. based on the mobile device's unique identifier). In one example, a filter can be implemented at the conversion library module level to apply the cellular network optimized protocol for a specific type of media content (e.g. media content associated with a specific artist, website, genre, media content type, etc.). In another example, a filter can be applied to use the cellular network optimized protocol only during a specified time of day period. These examples are provided by way of instruction and not of limitation. Filters can be applied at the mobile device level and/or at the proxy server level.

It is noted that the request to the proxy server can be associated with an anonymized device identity. This can allow an administrator of the application to set in real time (e.g. assuming processing and networking latency) what percentage of users should have access to the cellular network optimized protocol and/or specific filters. These users can further be broken down into other subsets based on such factors as location, hierarchy in a corporation, historical use of application, etc. This option can also be used for testing purposes as well. A set of device identities can be prioritized (e.g. associated with important users). These prioritized identities can flag the conversion library module to always apply the cellular network optimized protocol regardless of other current filtering instructions.

Figure 5:
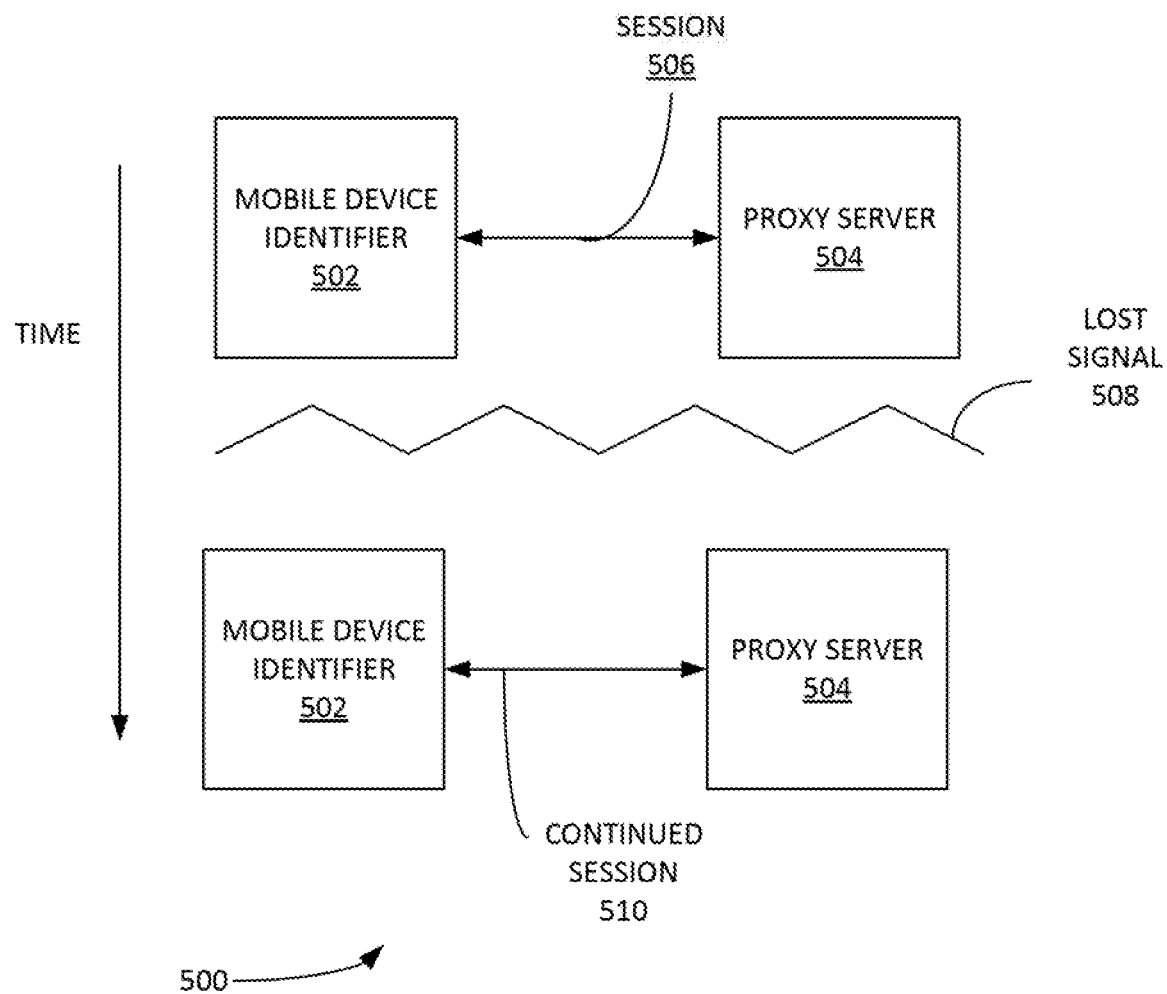
FIG. 5 depicts an example process of session continuation when the session undergoes a temporary break, according to some embodiments.

The device identifier provided by the conversion library module can be used to provide uninterrupted downloading of files to an application in a mobile device even when the mobile device undergoes an IP address change (e.g. when the mobile device changes a location and couples with a new Wi-Fi network, etc.). FIG. 5 depicts an example process 500 of session continuation when the session undergoes a temporary break, according to some embodiments. Mobile device can include a mobile-device identifier 502 used in a session 506 with a proxy server 504. Session 506 can suffer a lost signal 508. Rather than creating a new session, a continued session 510 can be implemented as the unique mobile-device identifier 502 can enable the proxy server 504 to continue at the point the lost signal 508 occurred. The unique mobile-device identifier 502 can be an alpha-numeric string.

The cellular network optimized protocol can implement a secure connection without the two round trips required in an HTTPS protocol. For example, a data transfer between a mobile device and a proxy server can be secured via a public key stored on the mobile device. For example, the cellular network optimized protocol public key can be stored in the conversion library module (e.g. by embedding a public key in the SDK). When a first request comes from the conversion library module, a secure session can be implemented. The conversion library module can provide the data that is signed and encrypted with the public key. The proxy server can have a private key to decode public key. It is noted that communication from the proxy to the destination server can be implemented with the HTTPS protocol.

Additional example attributes of a cellular network optimized protocol are now provided. The cellular network optimized protocol may not directly utilize a Domain Name System (DNS) server. The cellular network optimized protocol may not an implement a TCP handshake process. The cellular network optimized protocol can implement a more efficient bandwidth probing process. For example, a TCP/HTTP protocol may implement a bandwidth probing technique to obtain an accurate network measurement. In contrast, the conversion library module can query an operating system of the mobile device to determine a current mobile network state (e.g. 2G, 3G, etc.) as the mobile device is periodically probing its current cellular network. Accordingly, the data transmissions using the cellular network optimized protocol need not perform separate bandwidth probing technique (e.g. TCP slow-start probing). Data transmissions using the cellular network optimized protocol can be set based on the transmission speed of the known current cellular network state.

The cellular network optimized protocol can implement a smarter backoff algorithm. A backoff algorithm can be used to space out repeated retransmissions of the same block of data. For example, when a data packet is dropped in a TCP protocol transmission, the TCP/HTTP protocol may restart by again implementing the bandwidth probing process. The cellular network optimized protocol can avoid this conservative TCP/HTTP 'backoff' technique and maintain the higher speed of the currently available cellular network.

Additional Systems and Architecture

Figure 6:
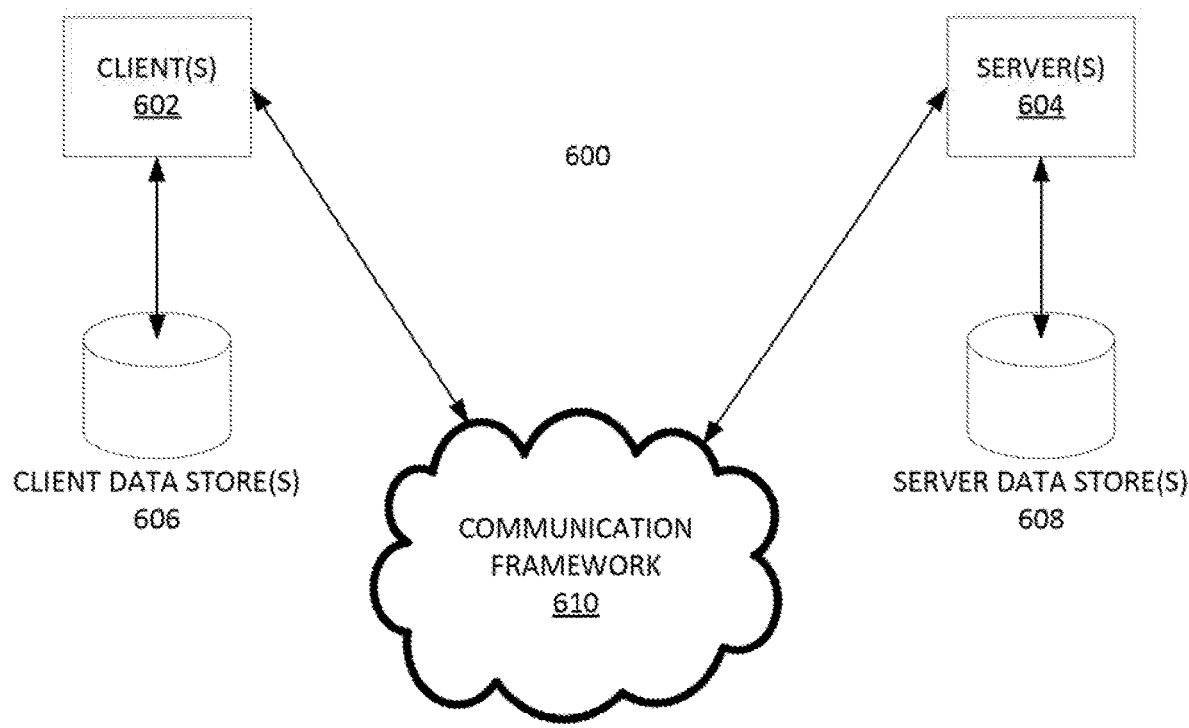
FIG. 6 is a block diagram of a sample computing environment that can be utilized to implement various embodiments.

FIG. 6 is a block diagram of a sample computing environment 600 that can be utilized to implement various embodiments. The system 600 further illustrates a system that includes one or more client(s) 602. The client(s) 602 can be hardware and/or software (e.g., threads, processes, computing devices). The system 600 also includes one or more server(s) 604. The server(s) 604 can also be hardware and/or software (e.g., threads, processes, computing devices). One possible communication between a client 602 and a server 604 may be in the form of a data packet adapted to be transmitted between two or more computer processes. The system 600 includes a communication framework 610 that can be employed to facilitate communications between the client(s) 602 and the server(s) 604. The client(s) 602 are connected to one or more client data store(s) 606 that can be employed to store information local to the client(s) 602. Similarly, the server(s) 604 are connected to one or more server data store(s) 608 that can be employed to store information local to the server(s) 604.

Figure 7:
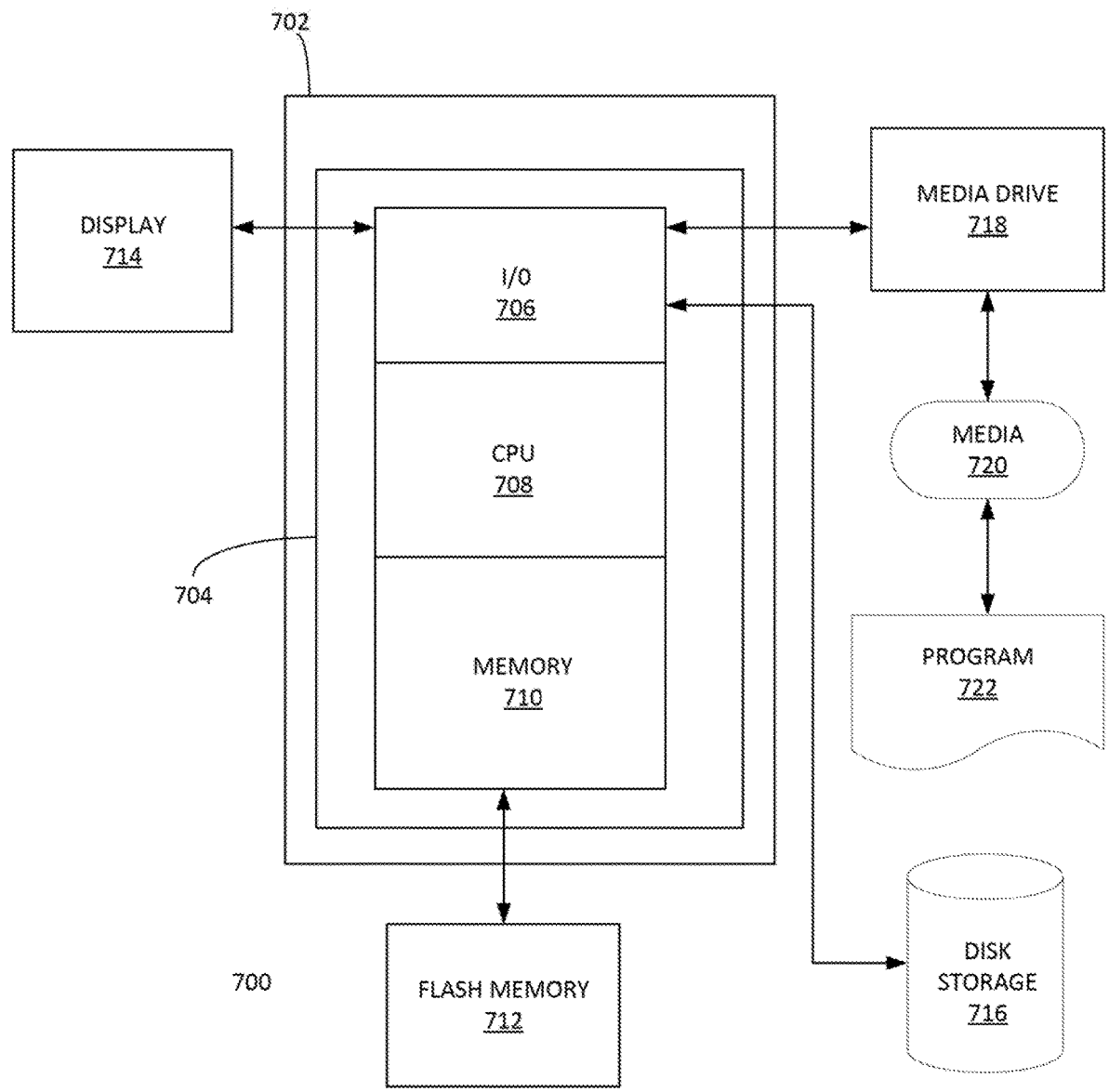
FIG. 7 depicts an exemplary computing system that can be configured to perform any one of the processes provided herein.

FIG. 7 depicts an exemplary computing system 700 that can be configured to perform any one of the processes provided herein. In this context, computing system 700 may include, for example, a processor, memory, storage, and I/O devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or some combination thereof.

FIG. 7 depicts computing system 700 with a number of components that may be used to perform any of the processes described herein. The main system 702 includes a motherboard 704 having an I/O section 706, one or more central processing units (CPU) 708, and a memory section 710, which may have a flash memory card 712 related to it. The I/O section 706 can be connected to a display 714, a keyboard and/or other user input (not shown), a disk storage unit 716, and a media drive unit 718. The media drive unit 718 can read/write a computer-readable medium 720, which can contain programs 722 and/or data. Computing system 700 can include a web browser. Moreover, it is noted that computing system 700 can be configured to include additional systems in order to fulfill various functionalities. Computing system 700 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

In one example, a computerized-system can include a mobile device comprising at least one computer processor, a memory and a network interface. An application implemented by the at least one computer processor of the mobile device creates a unique identifier. The unique identifier is stored in the memory of the mobile device. The unique identifier acts as a permanent address for sending packets from a proxy server to the mobile application. A current internet protocol (IP) address of the mobile device is only used as a temporary forwarding address for a packet. A proxy server that detects when the IP address of the mobile device changes via a communication of the change from the application. The proxy server continues sending a remaining data of a download session to a newly acquired IP address without having to restart the download session from scratch.

Message by Message Tunability of Message Reliability in a Cellular Network

Figure 8:
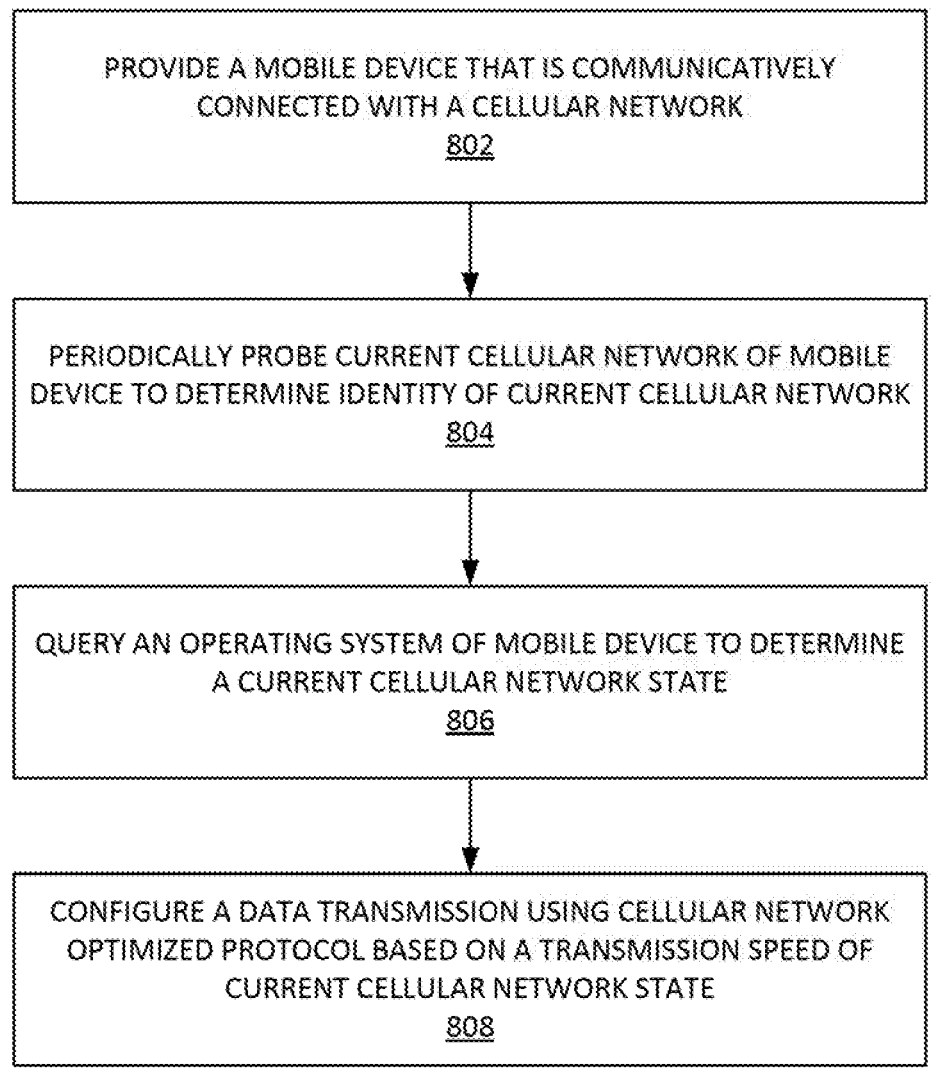
FIG. 8 illustrates an example process for message by message tunability of message reliability in a cellular network, according to some embodiments.

FIG. 8 illustrates an example process 800 for message by message tunability of message reliability in a cellular network, according to some embodiments. Process 800 can provide message by message tunability of message reliability between n-nodes (e.g. a mobile device, a server, another user-side computing device, etc.) to n-other nodes. In step 802, an intermediate networking service for messaging can be provided between different nodes of a network (e.g. data-communication network, a mobile network, content delivery network, etc.). The tuned message can originate from a user's computing device and be delivered to a group of nodes. The group of nodes can be the computing devices of a group of players in an online game room.

In step 804, process 800 can periodically probe a current cellular network of a mobile device to determine an identity of the current cellular network. In step 806, process 800 can query an operating system of the mobile device to determine a state of the cellular network. In step 808, process 800 can configure a data transmission using an optimized protocol of the cellular network based on a transmission speed of the state of the cellular network.

Various reliability modes can be discussed. Reliability and in-order modes can be provided. These modes are tunable (e.g. not just in a purely reliable mode) in steps 804 and 806. Tunablity can based on the various numbers to data packets and/or messages. Tunablity can based on global sequencing vs. local sequencing as well.

In one example, a flexibly reliable protocol and API can be provided. This can allow the networking system to implement a synchronizing call into an SDK (e.g. as provided in client library module 206, etc.). The synchronizing call can instruct that the message be sent to receiving nodes a reliable fashion with a deadline (e.g. 500 ms). If the deadline is not met, then the networking system drops the message. In another reliability mode, the application utilizing process 800 can have the application call the relevant code to deliver the message to best of ability w/out reliability (e.g. a best effort mode that uses less bandwidth, etc.). In another reliability mode, process 800 can impose complete reliability. In this mode, process 800 can deliver the message regardless of the time to arrival (e.g. or with a relatively longer waiting time).

Process 800 can use a flag that provides ordering among messages. For example, process 800 can tune a sequence of messages for a hard deadline of 500 ms and to deliver only the message in a specified order (e.g. based on a global or local sequence number of the message). If the messages fall out of order, then process 800 can cause only the lower sequence numbered messages to be delivered and drop higher/out of order sequenced messages.

In one example, one client can send multiple messages can be sent to n clients in a group of clients (e.g. wen n clients are messaging each other or addressing a single other client). Accordingly, a sequence of messages can be between each destination and source. For example, if a source A is sending to source B there is a unique sequencing of messages between A and B while there is a global sequence number the relevant server that is managing the networking of the messages. This global sequence number can be maintained for all messages going through the networking system.

Process 800 can implement the various techniques of FIG. 1-7 to optimize message delivery as well (e.g. maintain session continuity across breaks, provide the reliability protocol, etc.).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented process for implementing message-by-message tunability of message reliability in a data-communication network comprising:
   providing an intermediate networking service for messaging between a plurality of different nodes of the data-communication network;
   periodically probing the data-communication network of a mobile device to determine an identity of the data-communication network;
   querying an operating system of the mobile device to determine a current state of the data-communication network; and
   configuring a data transmission of a tuned message using an optimized protocol of the data-communication network based on a transmission speed of the current state of the data-communication network, wherein the optimized protocol comprises a tunable mode of the data-communication network that comprises an in-order mode, and wherein tunability of the in-order mode is based on a specified data packet sequencing protocol that includes a global sequencing protocol or a local sequencing protocol.

2. The computer-implemented process of claim 1, wherein the data-communication network comprises a cellular network.

3. The computer-implemented process of claim 1, wherein the tuned message originates from a user's computing device and is delivered to the plurality of different nodes.

4. The computer-implemented process of claim 1, wherein the plurality of different nodes comprises a plurality of computing devices of a group of players in an online game room.

5. The computer-implemented process of claim 1, wherein the tunable mode further comprises a reliability mode of the data-communication network.

6. The computer-implemented process of claim 5, wherein the tunability of the reliability mode is further based on a specified number assigned to data packets and messages communicated by the optimized protocol.

7. A computerized system for implementing message-by-message tunability of message reliability in a data-communication network comprising:
   at least one processor configured to execute instructions; and
   at least one memory containing instructions when executed on the at least one processor, causes the at least one processor to perform operations that:
      provide an intermediate networking service for messaging between a plurality of different nodes of a cellular network;
      periodically probe a current cellular network of a mobile device to determine an identity of the current cellular network;
      query an operating system of the mobile device to determine a state of the cellular network; and
      configure a data transmission using an optimized protocol of the cellular network based on a transmission speed of the state of the cellular network, wherein the optimized protocol comprises a tunable mode of the data-communication network that comprises an in-order mode, and wherein tunability of the in-order mode is based on a specified data packet sequencing protocol that includes a global sequencing protocol or a local protocol.

8. The computerized system of claim 7, wherein the data-communication network comprises the cellular network.

9. The computerized system of claim 7, wherein a tuned message originates from a user's computing device and is delivered to a group of nodes.

10. The computerized system of claim 9, wherein the group of nodes comprises a plurality of computing devices of a group of players in an online game room.

11. The computerized system of claim 7, wherein the tunable mode further comprises a reliability mode of the data-communication network.

12. The computerized system of claim 11, wherein the tunability of the reliability mode is further based on a specified number assigned to data packets and messages communicated by the optimized protocol.

* * * * *